(12) United States Patent
Mazzarolo et al.

(10) Patent No.: US 11,540,566 B2
(45) Date of Patent: Jan. 3, 2023

(54) GARMENT WITH AN EMERGENCY DEVICE AND ASSOCIATED EMERGENCY METHOD

(71) Applicant: Alpinestars Research S.p.A., Maser (IT)

(72) Inventors: Giovanni Mazzarolo, Coste di Maser (IT); Colin Ballantyne, Asolo (IT)

(73) Assignee: ALPINESTARS RESEARCH S.P.A., Maser (IT)

( * ) Notice: Subject to any disclaimer, the term of this patent is extended or adjusted under 35 U.S.C. 154(b) by 3 days.

(21) Appl. No.: 14/910,066

(22) PCT Filed: Aug. 1, 2014

(86) PCT No.: PCT/IB2014/063625
§ 371 (c)(1),
(2) Date: Feb. 4, 2016

(87) PCT Pub. No.: WO2015/019261
PCT Pub. Date: Feb. 12, 2015

(65) Prior Publication Data
US 2016/0174626 A1    Jun. 23, 2016

(30) Foreign Application Priority Data

Aug. 6, 2013 (IT) .......................... TV2013A000130

(51) Int. Cl.
*A41D 13/018* (2006.01)
*A41D 27/20* (2006.01)
(Continued)

(52) U.S. Cl.
CPC ........... *A41D 13/018* (2013.01); *A41D 1/002* (2013.01); *A41D 27/205* (2013.01);
(Continued)

(58) Field of Classification Search
CPC .... A41D 13/018; A41D 1/002; A41D 27/205; A41D 2600/102; G08B 25/016; G08B 29/185; H04M 1/72538; A42B 3/046
(Continued)

(56) References Cited

U.S. PATENT DOCUMENTS 6,126,194 A    10/2000   Yaniv et al.
6,801,140 B2*  10/2004   Mantyjarvi ............ A44B 19/30
                                                       340/999

(Continued)

FOREIGN PATENT DOCUMENTS

CN     202619644 U     12/2012
DE     102009033560 A1  9/2010
(Continued)

OTHER PUBLICATIONS

Espacenet translation of KR101207012 (which is also published as KR 20120078760) specification/description, translated and printed on Jun. 11, 2018.*

(Continued)

*Primary Examiner* — Alissa L Hoey
(74) *Attorney, Agent, or Firm* — Fredrikson & Byron, P.A.

(57) ABSTRACT

A garment is intended to identify a danger situation for the user and react. The garment comprises an emergency device provided with sensors. Furthermore, the emergency device comprises an electronic processing unit and a supervisor and communication unit. The supervisor and communication unit, after being informed of the danger situation by the electronic processing unit, monitors the user by means of the sensors and assesses the level of user activity in order to decide or not to call for further assistance.

20 Claims, 6 Drawing Sheets

(51) Int. Cl.
*A41D 1/00* (2018.01)
*G08B 21/04* (2006.01)

(52) U.S. Cl.
CPC ...... *A41D 2600/102* (2013.01); *G08B 21/043* (2013.01); *G08B 21/0446* (2013.01)

(58) Field of Classification Search
USPC .................................................. 2/102, 455
See application file for complete search history.

(56) References Cited

U.S. PATENT DOCUMENTS

| | | | |
|---|---|---|---|
| 6,805,519 B1 | 10/2004 | Courtney | |
| 7,181,192 B2 | 2/2007 | Panasik et al. | |
| 8,232,881 B2 | 7/2012 | Hertz | |
| 8,662,528 B1 | 3/2014 | Abdulaziz | |
| 9,963,210 B1* | 5/2018 | Ebot | B63C 9/1055 |
| 9,974,345 B2* | 5/2018 | Raanan | A41D 13/018 |
| 2001/0024949 A1 | 9/2001 | Yanagido et al. | |
| 2002/0023324 A1* | 2/2002 | Kobayashi | B60R 11/02 |
| | | | 24/633 |
| 2006/0143775 A1* | 7/2006 | Kim | A41D 1/005 |
| | | | 2/102 |
| 2006/0164280 A1* | 7/2006 | Nehls | G08C 17/02 |
| | | | 341/176 |
| 2006/0212986 A1 | 9/2006 | Mahoney | |
| 2006/0288464 A1 | 12/2006 | Warden | |
| 2007/0236361 A1* | 10/2007 | Farhadian | A44B 19/24 |
| | | | 340/687 |
| 2007/0281732 A1* | 12/2007 | Fox | A45F 5/02 |
| | | | 455/550.1 |
| 2008/0256687 A1 | 10/2008 | Spencer | |
| 2009/0055053 A1* | 2/2009 | Carmeli | B60R 21/0132 |
| | | | 701/45 |
| 2009/0072988 A1 | 3/2009 | Haywood | |
| 2009/0195400 A1* | 8/2009 | Oreshkin | A41D 1/002 |
| | | | 340/686.1 |
| 2009/0254003 A1 | 10/2009 | Buckman | |
| 2010/0065454 A1* | 3/2010 | Badillo | A45C 9/00 |
| | | | 206/320 |
| 2012/0172681 A1 | 7/2012 | Sun et al. | |
| 2012/0190413 A1* | 7/2012 | Ojeda | A45F 5/021 |
| | | | 455/575.8 |
| 2012/0223833 A1 | 9/2012 | Thomas et al. | |
| 2012/0304367 A1* | 12/2012 | Howard | A42B 3/046 |
| | | | 2/413 |
| 2013/0041272 A1 | 2/2013 | Guillen Arredondo et al. | |
| 2016/0183607 A1* | 6/2016 | Lopez Yunez | A41D 13/018 |
| | | | 2/455 |
| 2017/0202279 A1* | 7/2017 | Mazzarolo | A41D 13/018 |
| 2018/0330581 A1* | 11/2018 | Latief | A45C 13/103 |

FOREIGN PATENT DOCUMENTS

| | | |
|---|---|---|
| EP | 1779772 A1 | 5/2007 |
| GB | 2350263 A | 11/2000 |
| JP | S632428 A | 1/1988 |
| JP | 2011207359 A | 10/2011 |
| JP | 2013092923 A | 5/2013 |
| KR | 101016610 B1 | 2/2011 |
| KR | 101016611 B1 | 2/2011 |
| KR | 20120078760 A | 7/2012 |
| SU | 1509021 A1 | 9/1989 |
| WO | 2008044222 A2 | 4/2008 |
| WO | 2012010483 A1 | 1/2012 |
| WO | 2012146957 A1 | 11/2012 |

OTHER PUBLICATIONS

PCT International Search Report and Written Opinion dated Dec. 16, 2014 for Intl. App. No. PCT/IB2014/063625, from which the instant application is based, 11 pgs.

* cited by examiner

GARMENT WITH AN EMERGENCY DEVICE AND ASSOCIATED EMERGENCY METHOD

RELATED APPLICATIONS

This application is a 35 U.S.C. 371 national stage filing from International Application No. PCT/IB2014/063625, filed Aug. 1, 2014, which claims priority to Italian Application No. TV2013A000130, filed Aug. 6, 2013, the teachings of which are incorporated herein by reference.

FIELD TO THE INVENTION

The present invention relates to a garment with an emergency device and to an associated emergency procedure. In particular the present invention refers to an emergency device and method suitable for being used in a motorcyclist garment.

TECHNICAL BACKGROUND

From a review of motorcycle accident statistics it is generally known that when another vehicle is involved, the accident has often occurred inside or close to an urban area. This often means that medical facilities are close by, and there are many people at an accident scene available to assist or call for help.

However, when looking at single vehicle accidents (about ⅓ of the total) it is noted that the majority of accidents happen in the countryside, sometimes in particularly remote areas. In these circumstances, if an accident happens and the rider is left unconscious, many hours may pass before the rider is discovered and appropriate help is provided, which may be too late to prevent serious permanent injuries or death.

The logical solution to this is for the rider to carry some kind of emergency locator beacon such as the one outlined in patent application US2012075872. However these have the distinct disadvantage in that they must be manually activated, which by definition means that the rider must be conscious and physically able to reach for and activate the unit.

In fact in many cases the cellular phone of the motorcyclist would be able to conduct the same function with the same level of interaction of the rider, so the notable expense of the beacon does not seem to be justified.

Expanding on this idea, it could be evaluated that if the emergency beacon was able to know when the rider has been involved in a crash, it could automatically activate and request help.

The recent availability of systems able to recognise a crash by a rider, such as that have been developed for the electronic airbag systems, has opened up this possibility, but this idea is not perfect because in the majority of cases the crash by the rider will not be serious, and thus a team of emergency services turning up to a minor incident would, apart from the waste of resources, create notable embarrassment to the rider such that they would be happier to remain with the manually activated beacon.

The object of the invention is to provide a garment with an emergency device and an associated method of utilisation, which solve the above mentioned problems and drawbacks.

Another object of the present invention, is to significantly overcome, and improve the prior art by providing a lower cost, more autonomous emergency call system that in the event of a crash only contacts emergency services in the particular cases where it is justified.

SUMMARY OF THE INVENTION

In particular it has been realized a garment comprising an emergency device. The emergency device can be provided with an electronic unit able to generate an emergency signal if a risk and/or at least one danger signal is detected by at least one sensors. The electronic unit comprises or is connectable to a transmission unit adapted to call for further assistance. The emergency device is preferably adapted to monitor the signals from the at least one sensors for a predetermined time before deciding whether to call for further assistance or not.

In particular, the invention comprises advantageously a garment, intended to identify a danger situation for the user and react, comprising an emergency device.

The emergency device comprises: at least one inflatable chamber, suitable for moving between a rest condition, wherein it is in a deflated status, and an operating condition, wherein it is in an inflated status; an inflator device coupled to the at least one inflatable chamber and designed for inflating the at least one inflatable chamber, once the inflator device is triggered; sensors suitable for detecting data concerning the acceleration undergone by the garment and movements of the user of the garment; an electronic processing unit designed for processing the acceleration data detected by the sensors and, when a danger situation is identified, for sending a triggering signal to the inflator device so as to inflate the at least one inflatable chamber; and a supervisor and communication unit.

According to the invention, when a danger situation is identified, the electronic processing unit concurrently with the triggering signal to the inflator device, sends an emergency signal to the supervisor and communication unit that, after being informed of the danger situation through the emergency signal received by the electronic processing unit, starts to monitor the user by means of the sensors for assessing, on the basis of the data detected by the sensors, the level of user activity in order to decide or not to call for further assistance.

Moreover, the invention comprises advantageously a method for identifying a danger situation and for emitting an automatic radio emergency call. The method comprises the following steps:

providing a garment comprising at least one inflatable chamber, suitable for moving between a rest condition, wherein it is in a deflated status, and an operating condition, wherein it is in an inflated status; an inflator device coupled to the at least one inflatable chamber and designed for inflating the at least one inflatable chamber; sensors; an electronic processing unit and a supervisor and communication unit;

identifying a danger situation for the user of the garment by processing the data detected by the sensors;

when a danger situation has been identified, sending a triggering signal to the inflator device, for inflating the at least one inflatable chamber.

The method further comprises the following steps:

monitoring for a first prefixed time period, after the danger situation has been identified, the user of the garment by means of the sensors for assessing the level of user activity; and deciding or not to call for further assistance through the supervisor and communication unit depending by the level of the assessed user's activity.

BRIEF DESCRIPTIONS OF DRAWINGS

The advantages and the characteristic features of the invention will be appreciated more clearly from the following description of a preferred embodiment of the invention with reference to the accompanying figures in which.

DETAILED DESCRIPTION OF EMBODIMENTS OF THE INVENTION

Figure 1:
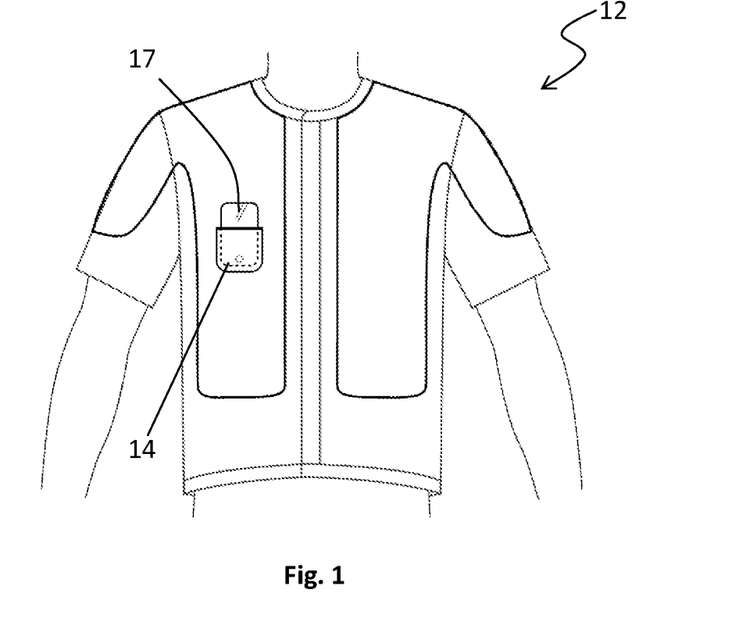
FIG. 1 shows a schematic front view of a garment according to the invention.

FIG. 1 shows a possible embodiments of a garment 12 according to the invention, in particular a vest style garment. It should be noted that although a vest-type garment is illustrated in FIG. 1, the system of the present invention could also be utilised on other items of wearing apparel, such as a one piece bodysuit, trousers, gloves, boots or even protective helmet.

As clarified below, the garment 12 is intended to identify a danger situation for the user and react.

Advantageously, the garment comprises an emergency device 13 which is provided with at least one inflatable chamber 28, an inflator device 26, sensors 18, an electronic processing unit 16 and a supervisor and communication unit 17.

The supervisor and communication unit 17, after being informed of the danger situation through an emergency signal received by the electronic processing unit, monitors the user by means of the sensors and assesses the level of user activity in order to decide or not to call for further assistance.

In a preferable embodiment of the invention, the supervisor and communication unit 17 comprises a cellular phone or smartphone 17.

For example, on the inside of the vest a pocket 14 can be provided on the chest. Such pocket 14 has been sized to comfortably accommodate a cellular phone or smartphone 17.

According to a possible embodiment of the invention, although the pocket 14 is visible in the figure, when the closed garment is viewed, as illustrated in FIG. 1, the smartphone 17 would in reality not be visible without opening the garment first. The pocket 14 has been advantageously provided on the inner layer of the garment 12 for at least two reasons:

for protecting the smartphone in case of impact, and for sitting as close as possible the smartphone 17 to the body of the user in order for the latter to be able to perceive the haptic alerts.

In other embodiments of the invention the pocket 14 may be in a different position on or external to the body (such as in an item of luggage), and/or the pocket itself may be additionally padded or armoured to prevent damage to the phone during an accident.

By "smartphone" it is meant a phone with a versatile operating system and additional radio receivers (Bluetooth and/or Wifi) which permits the phone to interact with other devices and process information not directly connected with telephony; however a basic cellular phone with an additional radio receiver would also be adequate, as clarified below.

In the introduction it was already mentioned that the first part of an autonomous emergency call system requires the system to know when the rider has crashed. The Italian patent application TV2012A000124 outlines an electronically activated airbag system for motorcyclists. The system comprises at least one inflatable bag (airbag), suitable for moving between a rest condition, wherein it is in a deflated status, and an operating condition wherein it is in an inflated status; and a gas generator coupled to the at least one inflatable bag. At the heart of this system there is an electronic unit and sensors (both in the unit and on the garment) which work in unison to determine when the rider has had an accident and inflate the inflatable bag/airbag using the gas generator. This provides additional protection against impacts during the accident. However, note that in the context of this invention the airbag and gas generator might be optional, the important part is the electronic signal that the rider has crashed.

At the same time, the emergency device 13 of the garment can be provided with an on-off switch suitable for disabling the airbag, namely the inflatable chambers, and the gas generator, without interfering with the operation of the electronic processing unit 16 and the supervisor and communication unit 17. In this way, the garment might offer a proper protection to the user, even when the latter is not on a motorcycle. As a matter of fact, for example, it would be possible to make an emergency call without the needing to also inflate the inflatable chambers.

In the above mentioned Italian patent application the electronic unit is provided with an expansion slot in which additional electronic assemblies may be inserted to extend the functionality of the system. In said patent one example provided is the inclusion of an RFID reader in order to identify that the inflatable inner garment was only used with a compatible outer garment.

For the purposes of this invention a new electronic assembly would be installed which contains a radio device (such as a class 2 Bluetooth receiver/transmitter or other network and transmission protocol) and/or a Global Positioning System (GPS) or equivalent navigation system reception antenna. Additional memory may also be provided such that the route taken by the rider and recorded by the GPS may be stored and downloaded by the rider to compile a logbook of their travels.

Figure 2:
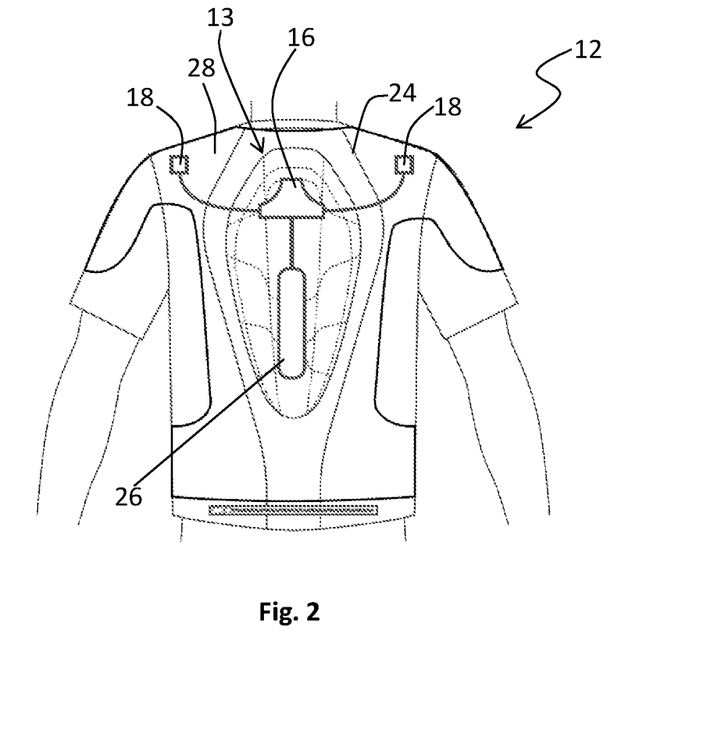
FIG. 2 shows a schematic rear view of a garment according to the invention.

FIG. 2 illustrates the rear of the garment 12 of FIG. 1. In this embodiment part of the rear pocket which covers the inflatable chamber 28 is covered in the centre with a back protector 24. The back protector 24 itself is used as a mounting platform to secure the electronic unit 16 and the gas generator or inflator device 26 which is used to fill an inflatable chamber of an airbag 28 with gas when the gas generator is triggered by the electronic processing unit in the event of an accident.

According to a possible embodiment of the present invention, two sensors 18 can be positioned on the rear upper shoulders of the garment 12, although the quantity and position of the sensors 18 could be any number, and anywhere on the body of the user and/or on the garment.

Additional sensors 18 may be present on board the electronic unit 16. Advantageously further sensors 18 may be provided, not connected to the detection of the accident, but connected to the monitoring of the rider after the crash (for example a heart rate monitor, or blood pressure sensor).

Figure 4:
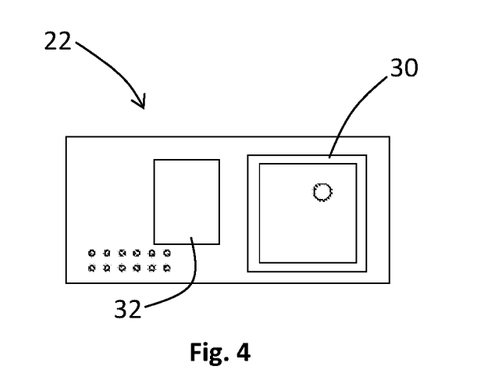
FIG. 4 shows a schematic view of the expansion board installed on a main circuit board of an electronic unit.

According to a possible embodiment of the present invention, FIG. 4 shows an expansion electronic PCB 22 which contains a GPS antenna 30 and a Bluetooth radio receiver and transmitter 32. If the phone is not provided on the electronic unit 16, it has to be situated within the rated operating range of a Bluetooth radio.

An example of the GPS unit is the UP501 system supplied by U-Blox SA, while an example of the Bluetooth chipset is the RN-03 supplied by Roving Networks Inc.

Figure 3:
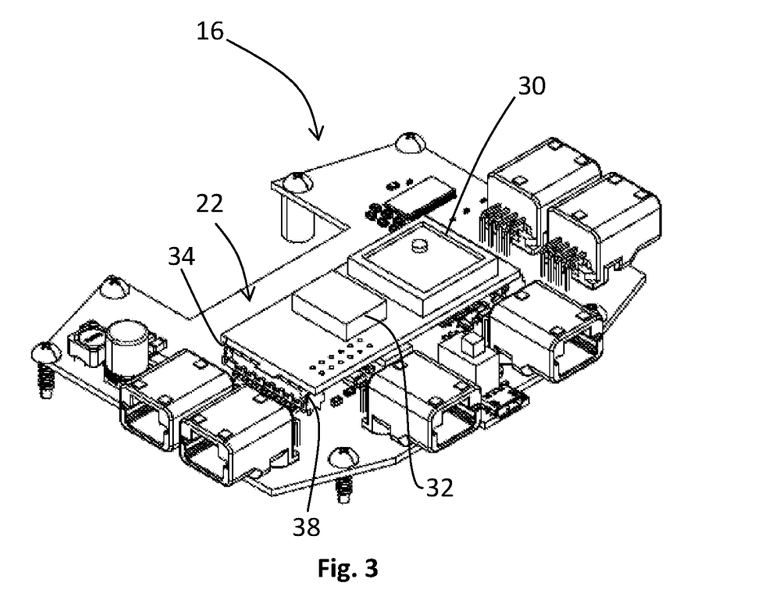
FIG. 3 shows a schematic view of an expansion board which contains a GPS and radio module.

Advantageously, the smaller PCB 22 has two connectors 34 on the underside which permit it to be mated to corresponding sockets 38 on the electronic unit 16 (see FIG. 3).

This modularity of the system means that if a customer purchases the electronic unit 16 without the expansion electronic PCB 22 and then changes their mind in future, the expansion electronic PCB 22 can be procured in isolation and installed at a later date to provide this additional functionality. Note that in this embodiment only a Bluetooth radio 32 is present on the expansion board, however it could also be possible that the GSM antenna is installed directly on the expansion electronic PCB 22. In this case the processing and decision making to monitor the rider would be carried out completely on board the electronic unit 16 without the requirement for the rider to own a smartphone 17. Furthermore the Bluetooth radio 32 may still additionally be present as this makes it easier for the user to setup the parameters of the electronic unit using an external device (not shown).

In other words, supervisor and communication unit could be composed by an electronic part or device 22 directly connected to the electronic unit 16 (advantageously the device 22 could be mounted on the electronic unit 16) and an external cellular phone 17 near the device (advantageously in a pocket on the garment). Advantageously, the electronic device 22 comprises a wireless communication interfaces adapted to be connected to the cellular phone 17.

According to a possible embodiment of the present invention, the supervisor part of the supervisor and communication unit 17 could be provided in the cellular phone. Advantageously, the cellular phone is a smartphone 17 programmed for considering the data from the sensors and to decide or not to call for further assistance. For example the smartphone could be programmed as shown in flow chart of FIG. 7.

According to a possible embodiment of the present invention, being the garment 12 provided with an airbag 28, in normal use it is expected that the garment 12 is worn with a compatible outer garment 42.

Figure 5:
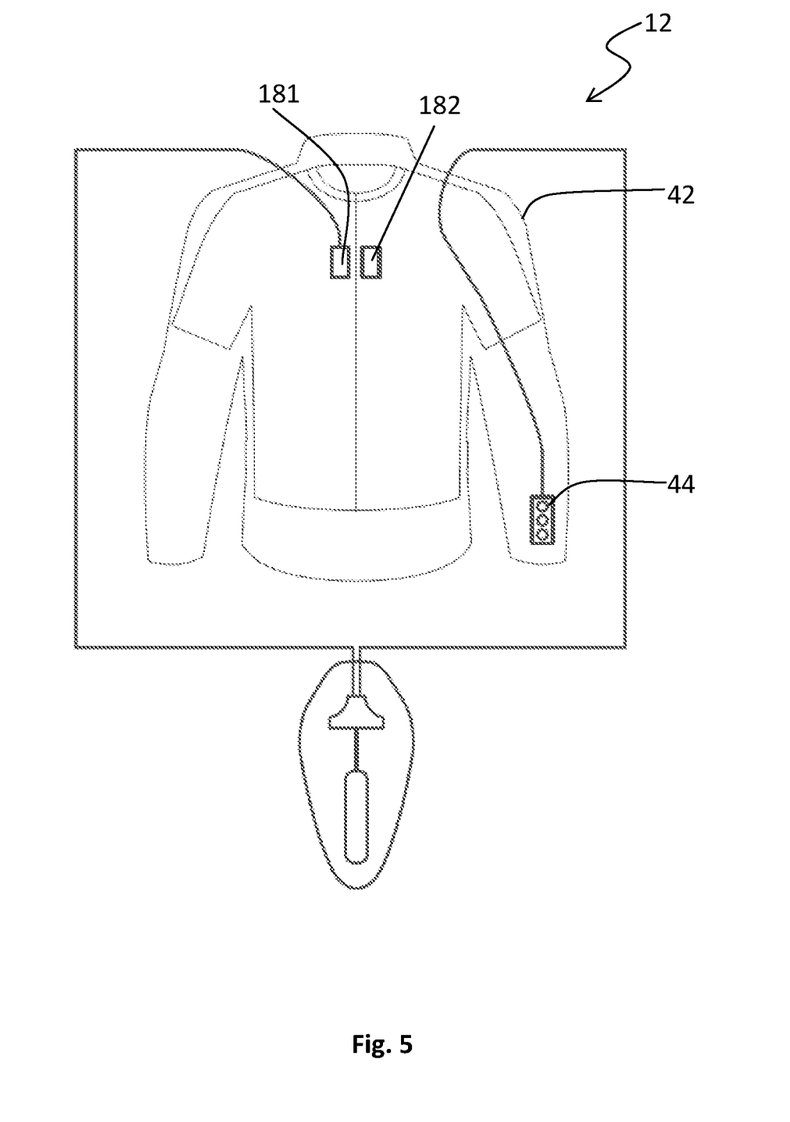
FIG. 5 shows a schematic view of an outer jacket into which the garment may be installed.

In FIG. 5, it is illustrated a possible connection between the compatible outer garment 42 between a zip switch sensor 181 and an arm mounted LED Display 44. The LED Display 44 can be positioned such that it is outside the garment and the indications of the LEDs can be viewed by the rider easily while riding.

According to a possible embodiment of the present invention, the zip switch sensor 181 has a corresponding magnet 182 on the other side of the zip such that if the garment front zip is opened, the distance between the sensor 181 and the magnet 182 will increase, causing the sensor 181 to no longer 'see' the magnet 182 and this in turn would cause the electronic unit 16 to power off. As such, the skilled artisan would appreciate that the zip sensor 181 functions as a connection or fastening sensor for the garment.

As mentioned earlier, the LED Display 44 can illuminate differing combinations of LEDs in order to communicate different operating states of the electronic unit 16. However with the expansion electronic PCB 22 installed the Bluetooth radio receiver and transmitter 32 permits the electronic unit 16 to be paired with the smartphone 17 of the rider. This permits the two devices to exchange information.

Figure 6:
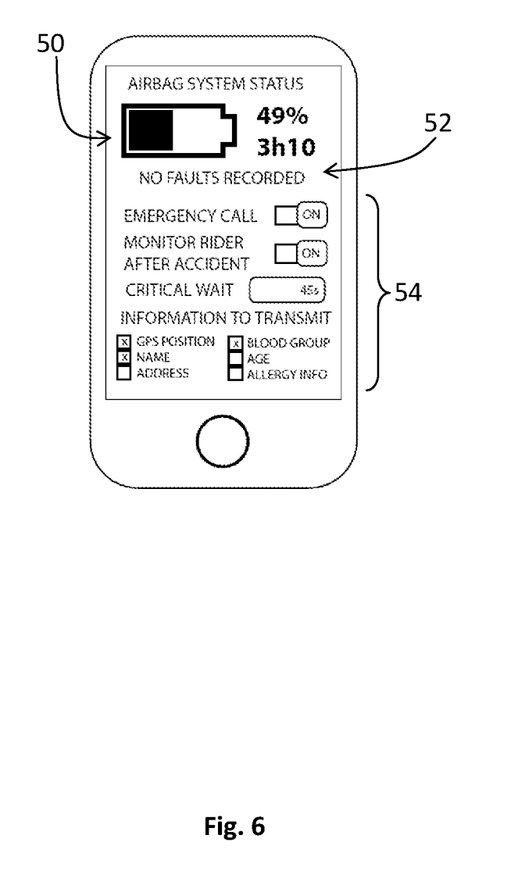
FIG. 6 shows a schematic view of an example of the information interface communicated to the user by the smartphone.

According to a possible embodiment of the present invention, with an application specially coded to use this information and running on the smartphone 17, the rider can obtain much more detailed information on the system which is presented in a way that is much easier to understand. FIG. 6 provides an example of how this information may be presented to the user. In this example the exact battery condition 50 is provided, it is clearly stated that there are no faults 52 with the system, and options 54 are provided on how to instruct the smartphone 17 to handle the emergency situation.

In order to achieve the successful monitoring of the user, there must be a certain decision making path which is followed by the electronic unit 16 and by the smartphone 17 alike.

Figure 8:
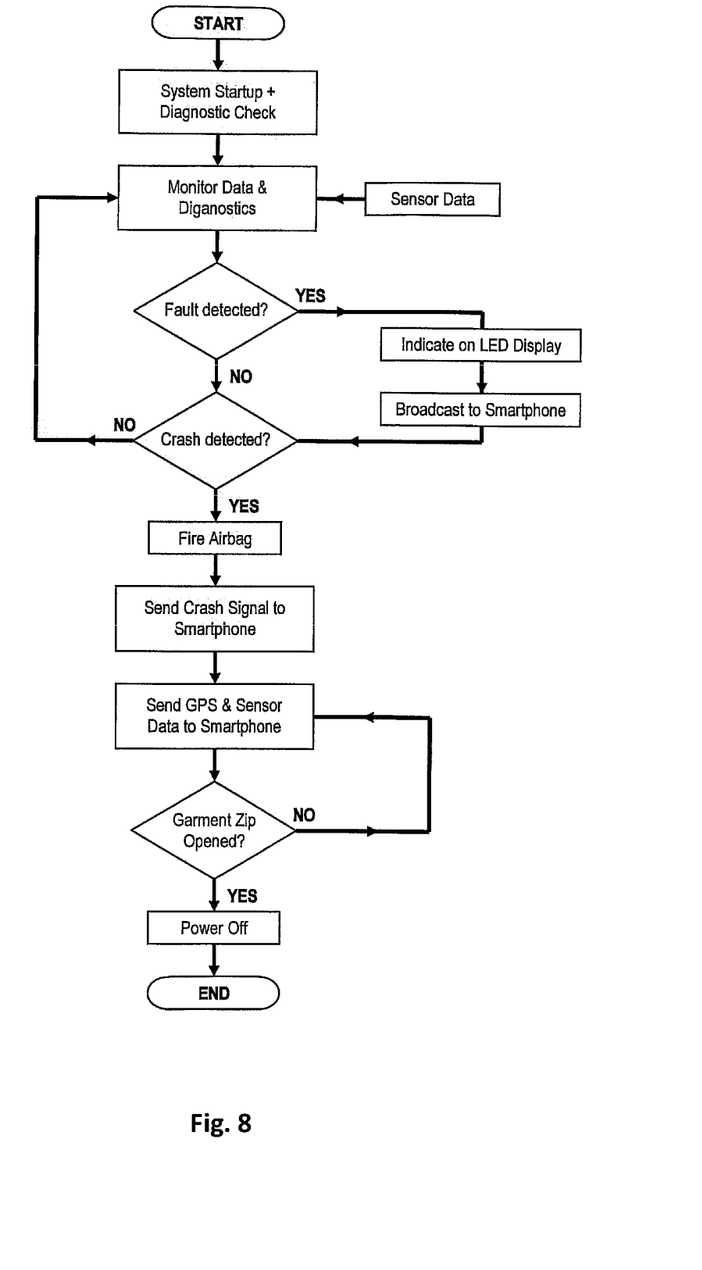
FIG. 8 shows an example of flow chart of the base logic of the main electronic system.

FIG. 8 outlines a possible logic path that will be followed by the electronic unit 16, according to a possible embodiment of the present invention.

Once the electronic unit 16 has been switched on there is an internal check that the system is working correctly. Once this has been completed data from the sensors 18 will be read and processed in two ways. The first way is to check if the sensor data makes sense and that the sensors 18 (and the electronic unit 16) are functioning correctly, and the second way is to identify patterns in the data that suggest the rider may be experiencing a crash situation. This may either be through an impact with an obstacle, or from losing control of the motorcycle.

When a danger situation (for example a crash situation) has been identified, the electronic unit 16 will send a triggering signal to the emergency device so that the garment reacts to the danger situation. The triggering signal is sent to the gas generator 26 and this will cause a rapid injection of gas into the inflatable chamber of the airbag 28 causing it to inflate and infer additional impact protection to the rider. Once inflated, the inflatable chamber move from a rest condition, wherein it is in a deflated status, to an operating condition, wherein it is in an inflated status.

Advantageously, at the same time an emergency signal will be passed to the supervisor and communication unit 17 which indicates that the rider has crashed, and then the data from the sensors 18 will be transmitted to the supervisor and communication unit. For example in the embodiment using a smartphone as supervisor, the data are sent directly to the smartphone 17 in real time. This data transmission will continue until the garment 12 is removed (which can be detected by the zip sensor 181) or the battery of the electronic unit 16 becomes discharged.

Figure 7:
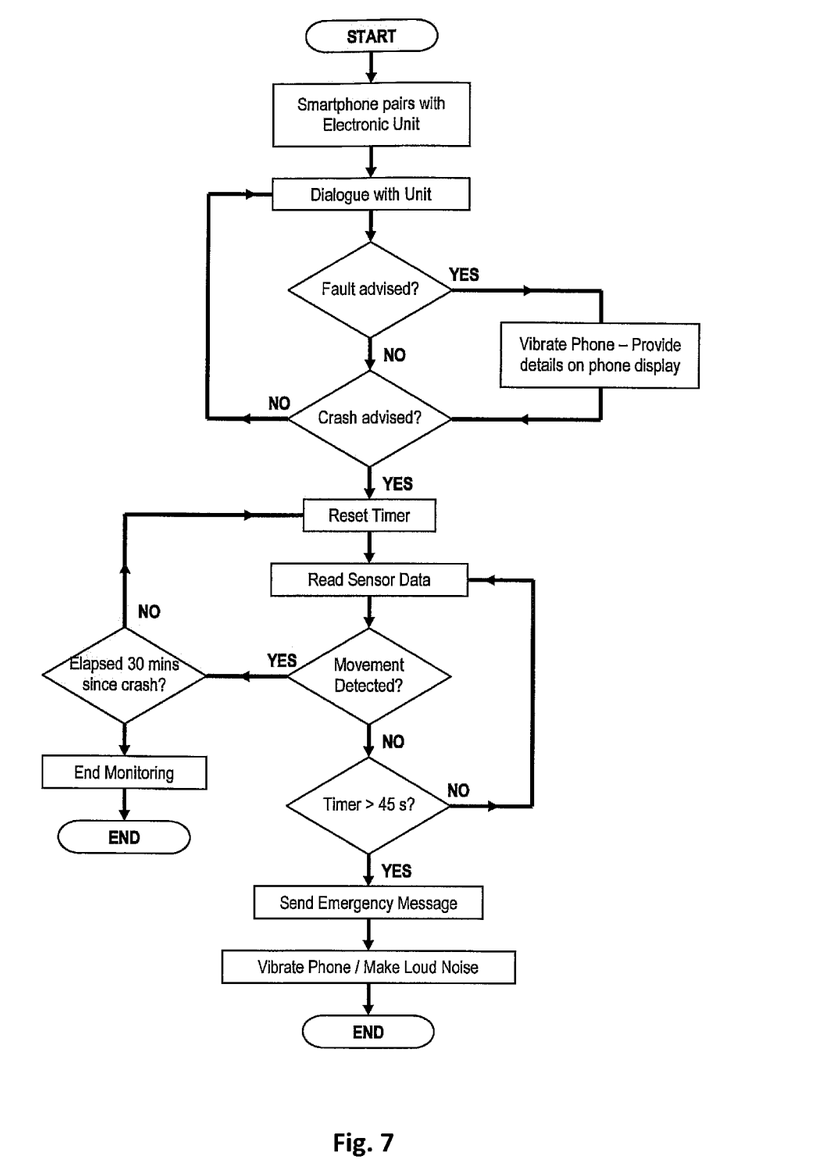
FIG. 7 shows an example of flow chart executed in the smartphone unit to autonomously monitor the status of the user.

FIG. 7 details a possible embodiment according to the invention of the corresponding logic path that will be followed by the application running in the smartphone 17 (or in the supervisor unit). In this case when the electronic unit 16 is powered on the smartphone 17 will see the Bluetooth signal, and provided the user had previously instructed the two devices to connect (known as 'pairing') a data connection will be established between the smartphone 17 and the electronic unit 16. This is established for the full period of time in which the garment 12 is worn. In the event there is a fault situation the unit will communicate this to the smartphone 17. This will cause the smartphone 17 to vibrate and details of the fault will be available on its display, and according to a possible embodiment of the invention, simultaneously to the LED Display 44 of the garment.

In the event where the rider has crashed a further signal will be sent to the smartphone 17. This will cause it to start a timer, and switch to a different mode of operation whereby the sensor data stream is monitored by the smartphone 17 itself. The smartphone 17 will analyse the sensor data to check for variations in the readouts.

According to a possible embodiment of the invention, given that outside effects (such as a strong wind blowing over the rider) could also produce some small oscillations, a suitable threshold can be used to filter between these outside effects and the actual movements of the rider. If the variations in the sensor readouts do not pass above these thresholds the smartphone 17 will consult the timer that it started and if this is greater than a first prefixed time period, for example 45 seconds, it will engage the procedure to transmit the emergency message using the means, and information content that had been previously prescribed by the rider.

Advantageously, it is entirely possible that the smartphone 17 sends more than one message to more than one different recipient.

According to a possible embodiment of the present invention, at the same time the smartphone 17 will operate its vibration motor and play a loud noise in order to catch the attention of the rider or any other person that may be in the vicinity, but who were unaware of the accident.

According to a further possible feature of the present invention, if on the other hand variations are seen in the data which confirm the rider is conscious, the timer will be reset, but if the first prefixed time period is elapsed since the crash has been identified and no further assistance has been initially called, for a second prefixed time period, for example 30 minutes, the electronic unit 16 will continue the surveillance cycle to check that the movements do not cease for an unexpected reason. After 30 minutes the smartphone 17 will end the monitoring cycle.

In conclusion the above invention overcomes the drawbacks of the existing prior art by being able to monitor the condition of the rider after they have been involved in an accident and to intelligently decide, without any input from the rider, whether to request further assistance or not.

The crash detected may be either an accident involving an impact with an obstacle, an accident where the riders lost control of the bike by themselves (a single vehicle accident as mentioned earlier) or may also be used in a non motor-cycling context to identify other accident scenarios such as tripping over or a fall from height.

With the installation of a suitable application on the smartphone, information can be exchanged between the smartphone and the electronic unit. Obviously the most important information is the signal that the rider has had an accident, but much more information may be shared to assist the rider, which will now be discussed.

In most cases the smartphone of the rider will be kept in a pocket close to the body. This may be a pocket in the airbag garment, or a pocket in a layer of underclothing or trousers that the user is wearing. In these situations, and in the event there is a fault or malfunction with the electronic system (or the associated airbag components), the smartphone application can activate the vibration motor in the smartphone to provide an additional haptic warning of the fault. This is particularly useful because during riding the rider will be looking at the road ahead, and may not notice any warnings illuminated on the LED Display for some considerable time. With the haptic warning the rider can be alerted that they require to consult the LED Display or smartphone application to understand the new status of the electronic unit.

In the context of this invention thought, the main benefit achieved through the smartphone link is the access to the GSM cellular network, which in the event of an accident permits a communication to be made to an outside party. This communication may be made by telephone, by the sending of an SMS Message, or the sending of e-mails or other data over the network if data transmission is available.

The recipients of this information may be a relation of the user, or a central agency which co-ordinates a response to provide assistance. It should be noted that the message may contain personal details of the user that they have previously stored in the phone (such as name, address, age, blood group, allergies, etc. . . . ) but additionally can contain location information taken from the GPS Receiver.

In the first case this would be taken from GPS antenna on the electronic assembly, as the physically larger antenna permits a more accurate signal, however if for some reason no location could be reckoned from that device, the smartphone application could then request the location to be taken from the built in GPS antenna which is very commonly integrated in today's smartphones.

Therefore, it can now be appreciated that system of the present invention can:

Identify a crash situation

Be connected wirelessly to a smartphone

Make a communication on the GSM network to request assistance which includes the location of the incident.

Moreover, the user activity is monitored by means of the sensors and the level of user activity is assessed in order to decide or not to call for further assistance.

Advantageously, this is obtained by continuing to utilise the data from the same sensors that were used to detect the crash.

In the current state of art almost all airbag systems (car and motorcycle) function through sensors that are mounted on the chassis or forks of the vehicle, however in the said Italian patent application it can be seen that the sensors used to detect a crash have been integrated into the garment. In this embodiment the sensors are mainly MEMs tri axis accelerometers, such as those manufactured by Analog Devices, however other sensors, such as GPS, gyroscopes, etc. . . . may be utilised.

Subsequently this permits the behaviour of the user to be monitored, even after the crash. Thus when the electronic unit sends, concurrently with the triggering signal to the inflator device, the crash/emergency signal to the smartphone, it then starts to share not just the diagnostic data of the system, but also the data from the sensors that are on the garment of the user. At this point the smartphone application will start to monitor the variations in these sensors and at the same time commence a countdown timer.

It can easily be understood that if the rider becomes unconscious during the accident he will be incapable of making any body movements and thus once the accident has completed its course they user will be completely still. This lack of movement will be seen by the sensors and monitored by the smartphone, and will be compared to the countdown timer. If after 45 seconds (or other prefixed time period which may be specified by the user) there is no change in the sensor output (indication that the rider has not moved) the application on the smartphone will send the emergency messages on the GSM network.

Obviously, the system can be set to decide for calling for further assistance when said monitored signals correspond to a level of user activity lower then a prefixed value and not necessarily to a complete lack of movement. In fact, for example, minimal movements can exist also when the user becomes unconscious.

At the same time (or during the monitoring period) the supervisor unit (in this case the smartphone application) may try to 'wake' the user either haptically (by running the vibration motor in the smartphone), or aurally (by playing an irritable noise at the highest volume on the loudspeaker of the device).

On the other hand, should the accident be less serious, it is obvious that once the accident has completed its course the rider will start to move in some way. These movements will be perceived by the sensors and transmitted to the supervisor unit or the smartphone, which will then reset the first countdown timer and will not send any emergency message. However given that in some circumstances the rider may not lose consciousness immediately, the user shall continue to be monitored for the next 30 minutes (or other preset time period), and if at any time in that period there are 45 seconds of non-movement (or under-threshold movements) recorded, an emergency communication will be made.

It may also happen that the user chooses to remove the garment during this monitoring period. In this case the zip sensor (outlined in said Italian patent application) would detect that the garment had been opened and in turn power off the electronic unit. This would prevent false alarms whereby the unworn garment lying on the ground could be mistaken for an unconscious user.

Therefore, the present invention refers to a garment comprising an emergency device, which contains sensing means and an electronic processing unit, intended to identify a danger situation for the user and react, whereby the electronic processing unit contains radio transmission & reception means to permit it to exchange data with a smartphone device present on the body of the user, characterised in that the smartphone, after being informed of the danger situation, monitors the user by means of the sensors in the garment, and autonomously assesses the level of user activity in order to decide or not to call for further assistance.

In particular, the garment as outlined above is adapted to be of use in motorcycling activities.

The system of the present invention is adapted to provide haptic warnings to the user in the event of a system malfunction.

Advantageously the garment as outlined above, can provide precise details to the user of the system malfunction using the screen of a smartphone to illustrate and explain the problem.

The system as outlined above, is adapted to provide an emergency call by using either telephony, SMS Messages, an e-mail or equivalent data transmission over the internet.

At this point it is clear how the predefined objects have been achieved.

Obviously, the above description of an embodiment applying the innovative principles of the present invention is provided by way of example of these innovative principles and must therefore not be regarded as limiting the scope of the rights claimed herein.

For example with "emergency call" is intended a communication using either telephony, SMS Messages, an e-mail or equivalent data transmission over the internet.

The invention claimed is:

1. Garment wearable by an user operating a vehicle in combination with an emergency device to identify a danger situation for the user involving operation of the vehicle, the garment and emergency device combination comprising:
   at least one inflatable chamber provided within the garment for moving between a rest condition when in a deflated status and an operating condition when in an inflated status;
   an inflator device coupled to the at least one inflatable chamber and for inflating the at least one inflatable chamber once the inflator device is triggered;
   sensors applied on the garment and having a function of detecting acceleration of the garment for signalling the danger situation and the same sensors having a further function of detecting movement of the garment following detection of the danger situation, whereby user activity level corresponds with the detected movement of the garment and determines whether to perform a call for further assistance;
   an electronic processing unit secured to the garment and in electrical communication with the inflator device and the sensors, the electronic processing unit configured for processing data of the acceleration detected by the sensors and, in event of a danger situation identified from one or more of the acceleration and the movements of the garment via the data, further configured for sending a triggering signal to the inflator device to inflate the at least one inflatable chamber; and
   a supervisor and communication unit situated in close proximity to the garment so as to be electrically communicable with the electronic processing unit and the sensors, the supervisor and communication unit being a unit separate from the electronic processing unit and comprising at least one mode of operation for performing the call for further assistance;
   characterized in that, in the event of said danger situation being identified, the electronic processing unit concurrently with sending of the triggering signal to the inflator device also sending an emergency signal to the supervisor and communication unit, the supervisor and communication unit triggered as a result of receiving the emergency signal to monitor via the sensors the garment and to assess accordingly whether to perform the call for further assistance, the sensors used initially by the electronic processing unit for detecting the danger situation and subsequently by the supervisor and communication unit for assessing whether to perform the call; and further comprising
   a fastening sensor on the garment that detects and confirms that the garment is properly worn, whereby without such confirmation the supervisor and communication unit is triggered to halt monitoring of the movements of the garment.

2. The garment and emergency device combination according to claim 1, characterized in that the supervisor and communication unit has a first mode of operation, whereby the supervisor and communication unit is configured to monitor, for a first prefixed time period after the danger situation has been identified by the electronic processing unit, the data detected by the sensors and to call for further assistance in event that said detected data corresponds to a level of activity lower than a threshold value, and the supervisor and communication unit has a mode of operation following the first mode, whereby the supervisor and communication unit is configured to monitor, for a second prefixed time period and after the first prefixed time period is elapsed and no further assistance has been initially called, the data detected by the sensors and to subsequently call for further assistance in event that said detected data corresponds to said level of activity lower than said threshold value.

3. The garment and emergency device combination according to claim 1, wherein the supervisor and communication unit comprises a cellular device.

4. The garment and emergency device combination according to claim 3, characterized in that the cellular device has a first mode of operation, whereby the cellular device is configured to monitor, for a first prefixed time period after the danger situation has been identified by the electronic processing unit, the data detected by the sensors and to call for further assistance in event that said detected data corresponds to a level of activity lower than a threshold value.

5. The garment and emergency device combination according to claim 3, wherein the cellular device comprises a cellular phone.

6. The garment and emergency device combination according to claim 5, characterized in that the supervisor and communication unit further comprises an expansion electronic board for aiding communication between the cellular phone and the electronic processing unit and the sensors, the expansion electronic board comprising a navigation system reception antenna and a radio device.

7. The garment and emergency device combination according to claim 6, characterized in that the radio device comprises a wireless communication interface for connecting to the cellular phone.

8. The garment and emergency device combination according to claim 6, characterized in that the navigation system reception antenna comprises a GPS device.

9. The garment and emergency device combination according to claim 6, characterized in that the expansion electronic board is directly connected or mounted on the garment.

10. The garment and emergency device combination according to claim 5, characterized in that the cellular phone is a smartphone programmed for processing the data detected by the sensors and for deciding whether to call for further assistance.

11. The garment and emergency device combination according to claim 10, further comprising a pocket sized for accommodating the smartphone.

12. The garment and emergency device combination according to claim 5, further comprising a pocket sized for accommodating the cellular phone or a smartphone.

13. The garment and emergency device combination according to claim 1, wherein the supervisor and communication unit comprises a cellular phone accommodated by one of an inner layer or an outer layer of the garment.

14. The garment and emergency device combination according to claim 13, wherein the inner layer and outer layer are separable, the outer layer configured for a user so as to be compatibly worn over the inner layer.

15. The garment and emergency device combination according to claim 1, wherein the supervisor and communication unit has wireless connection to one or more of the electronic processing unit and the sensors.

16. The garment of claim 1, wherein the fastening sensor is a zip sensor.

17. Method for identifying a danger situation and for emitting an automatic radio emergency call, comprising the following steps:
providing a garment wearable by an user operating a vehicle in combination with an emergency device to identify a danger situation for the user involving operation of the vehicle, the garment and emergency device combination comprising:
at least one inflatable chamber provided within the garment for moving between a rest condition when in a deflated status and an operating condition when in an inflated status;
an inflator device coupled to the at least one inflatable chamber and for inflating the at least one inflatable chamber once the inflator device is triggered;
sensors applied on the garment and having a function of detecting acceleration of the garment for signalling the danger situation and the same sensors having a further function of detecting movement of the garment following detection of the danger situation, whereby user activity level corresponds with the detected movement of the garment and determines whether to perform a call for further assistance;
an electronic processing unit secured to the garment and in electrical communication with the inflator device and the sensors, the electronic processing unit configured for processing data of the acceleration detected by the sensors and, in event of a danger situation identified from one or more of the acceleration and the movements of the garment via the data, further configured for sending a triggering signal to the inflator device to inflate the at least one inflatable chamber; and
a supervisor and communication unit situated in close proximity to the garment so as to be electrically communicable with the electronic processing unit and the sensors, the supervisor and communication unit being a unit separate from the electronic processing unit and comprising at least one mode of operation for performing the call for further assistance;
identifying a danger situation via the electronic processing unit for an user of the garment by processing data detected by the sensors;
when the danger situation has been identified, the electronic processing unit concurrently with sending a triggering signal to the inflator device for inflating the at least one inflatable chamber also sending an emergency signal to the supervisor and communication unit, the supervisor and communication unit triggered as a result of receiving the emergency signal to monitor via the sensors the garment and to assess accordingly whether to perform the call for further assistance;
the method further comprising the following steps:
monitoring for a first prefixed time period, after the danger situation has been identified, movement or lack thereof of the garment by means of the sensors for assessing via the supervisor and communication unit a level of activity of the user; and
deciding via the supervisor and communication unit whether to call for further assistance depending on the level of the user's activity;
wherein the sensors are used initially by the electronic processing unit for detecting the danger situation and subsequently by the supervisor and communication unit for assessing whether to call for further assistance; and further comprising a fastening sensor on the garment that detects and confirms that the garment is properly worn, whereby without such confirmation the supervisor and communication unit is triggered to halt monitoring of the movements of the garment.

18. Method according to claim 17, in which the level of the user's activity for deciding automatically to call for further assistance corresponds to a level of activity lower than a prefixed value.

19. Method according to claim 17, further comprising a step of monitoring for a second prefixed time period, after the first prefixed time period is elapsed and no further assistance has been initially called, the user of the garment by means of the sensors for assessing the level of the user's activity.

20. Garment wearable by an user operating a vehicle in combination with an emergency device to identify a danger situation for the user involving operation of the vehicle, the garment and emergency device combination comprising:
  at least one inflatable chamber provided within the garment for moving between a rest condition when in a deflated status and an operating condition when in an inflated status;
  an inflator device coupled to the at least one inflatable chamber and for inflating the at least one inflatable chamber once the inflator device is triggered;
  sensors applied on the garment and having a function of detecting acceleration of the garment for signalling the danger situation and the same sensors having a further function of detecting movement of the garment following detection of the danger situation, whereby user activity level corresponds with the detected movement of the garment and determines whether to perform a call for further assistance;
  an electronic processing unit secured to the garment and in electrical communication with the inflator device and the sensors, the electronic processing unit configured for processing data of the acceleration detected by the sensors and, in event of a danger situation identified from one or more of the acceleration and the movements of the garment via the data, further configured for sending a triggering signal to the inflator device to inflate the at least one inflatable chamber; and
  a smartphone situated in close proximity to the garment so as to be electrically communicable with the electronic processing unit and the sensors, the smartphone being a unit separate from the electronic processing unit and comprising at least one mode of operation for performing a call for further assistance;
  characterized in that, in the event of said danger situation being identified, the electronic processing unit concurrently with sending of the triggering signal to the inflator device also sending an emergency signal to the smartphone, the smartphone triggered as a result of receiving the emergency signal to monitor via the sensors the garment and to assess accordingly whether to perform the call for further assistance, the sensors used initially by the electronic processing unit for detecting the danger situation and subsequently by the smartphone for assessing whether to perform the call; and further comprising
  a fastening sensor on the garment that detects and confirms that the garment is properly worn, whereby without such confirmation the smartphone is triggered to halt monitoring of the movements of the garment.

* * * * *